United States Patent [19]

Horowitz et al.

[11] 4,146,458
[45] Mar. 27, 1979

[54] ELECTROCHEMICAL DEVICE HAVING AN OXYGEN ELECTRODE CONTAINING A PYROCHLORE TYPE COMPOUND ELECTROCATALYST

[75] Inventors: Harold S. Horowitz, Clark; John M. Longo, New Providence; Joel I. Haberman, Westfield, all of N.J.

[73] Assignee: Exxon Research & Engineering Co., Florham Park, N.J.

[21] Appl. No.: 856,647

[22] Filed: Dec. 2, 1977

[51] Int. Cl.² .................. C25C 7/02; B01J 21/00; B01J 23/00; H01M 4/90
[52] U.S. Cl. .................. 204/277; 204/29; 252/461; 252/472; 429/27; 429/40; 429/44; 429/122
[58] Field of Search .................. 204/277, 29 DR; 252/461, 472; 424/27, 40, 44, 122

[56] References Cited

U.S. PATENT DOCUMENTS

| | | | |
|---|---|---|---|
| 3,305,402 | 2/1967 | Jones et al. | 136/120 |
| 3,405,010 | 10/1968 | Kordesch et al. | 136/120 |
| 3,536,533 | 10/1970 | Kitamura et al. | 136/86 |
| 3,682,840 | 8/1972 | Van Loan | 252/518 |
| 3,691,052 | 9/1972 | Langley | 204/290 F |
| 3,769,382 | 10/1973 | Kuo et al. | 264/61 |
| 3,951,672 | 4/1976 | Langley et al. | 252/514 |

FOREIGN PATENT DOCUMENTS 1415684 11/1975 United Kingdom.

OTHER PUBLICATIONS

Derwent's Basic Abstract J., Sect. E, Chemdoc, Week No. Y25, Abstract No. 320 (Aug. 17, 1977), Dervent Accemion No. 44866Y/25.
Nat'l Bur. Stands., Wash. D. C., Inst. for Mat. Research, Abstract of Rept., No. NBSIR-75-742 (1975).
O'Grady et al., Tech. Report No. 37, "Ru Oxide Catalysts for O₂ Electrode", Contract #N0014-67-A-04-04-0006 (AD779-899), O.N.R., May 1977.
Torgo, Raccah & Goodenough, Mat. Res. Bull., vol. 4, pp. 191-202, 1969.
Sleight, Mat. Res. Bull., vol. 6, p. 775 (1971).
Bouchard & Gillson, Mat. Res. Bull., vol. 6, pp. 669-680 (1971).

*Primary Examiner*—R. L. Andrews
*Attorney, Agent, or Firm*—Kenneth P. Glynn

[57] ABSTRACT

An electrochemical device is described which has an oxygen electrode which contains a pyrochlore type electrocatalyst material. This electrocatalyst material is one or more electrically conductive pyrochlore compounds selected from the compounds of the following formula:

$$A_2B_2O_{7-y} \qquad (1)$$

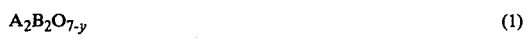

wherein A is any of the known pyrochlore structure metal cations, B is a pyrochlore structure metal cation at least a major portion of which is selected from the group consisting of one or more of Ru, Rh, Ir, Os, Pt, Ru-Pb mixtures and Ir-Pb mixtures, and wherein $0 \leq y \leq 1.0$. Desirably, A is a pyrochlore structure metal cation at least a major portion of which is selected from the group consisting of one or more of Pb, Bi and Tl. A preferred group of pyrochlore compounds which are included in the above formula are those having the following formula:

$$Pb_2[M_{2-x}Pb_x]O_{7-y} \qquad (2)$$

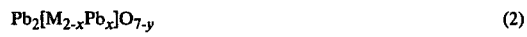

wherein M is selected from the group consisting of Ru and Ir, wherein $0 \leq X \leq 1.2$ and $0 \leq y \leq 1.0$.

33 Claims, 20 Drawing Figures

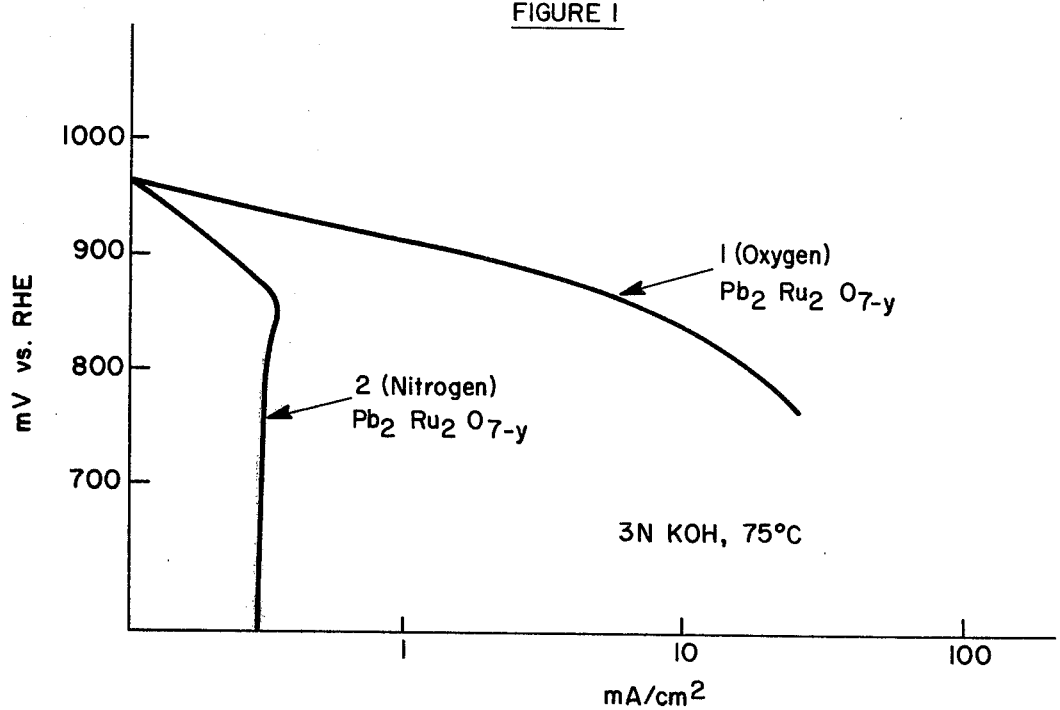
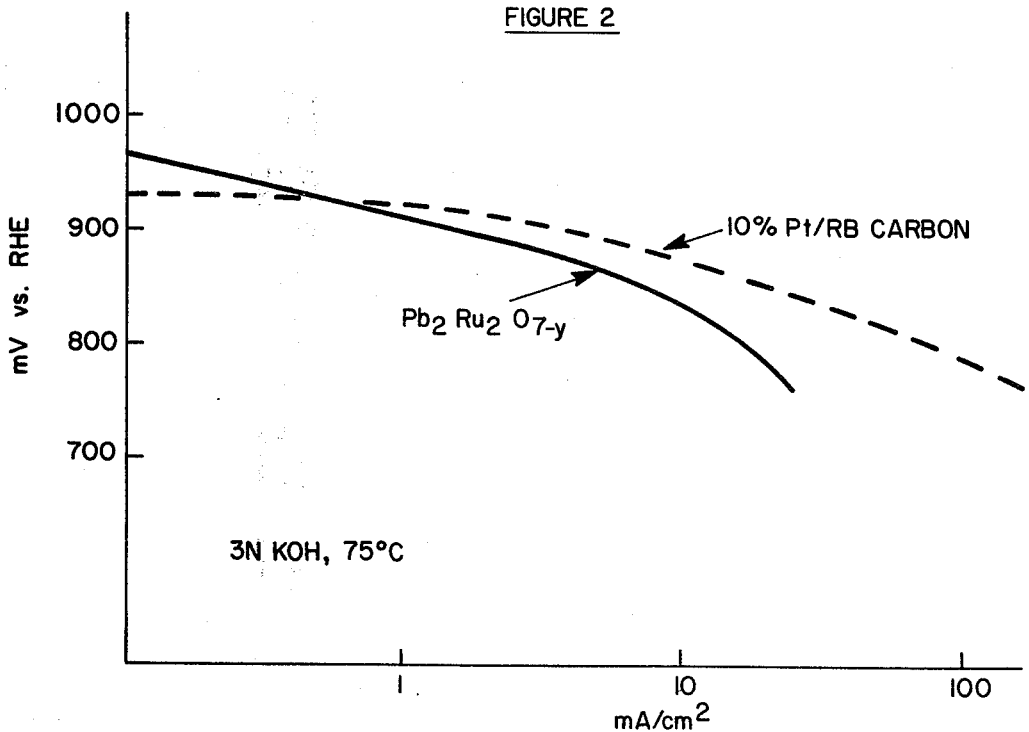

ELECTROCHEMICAL DEVICE HAVING AN OXYGEN ELECTRODE CONTAINING A PYROCHLORE TYPE COMPOUND ELECTROCATALYST

BACKGROUND OF THE INVENTION AND STATEMENT OF PRIOR ART

The present invention is directed to electrochemical devices, and more specifically is directed to electrochemical devices having oxygen electrodes which contain specified pyrochlore type compound electrocatalyst materials including specified lead-rich pyrochlore compounds.

A number of various types of electrochemical devices have been developed over the past few years for the production of electrical energy by electrochemical reaction and obversely for the consumption of electrical energy to effectuate electrochemical reactions. Many of these devices rely upon a reaction involving oxygen (or air) as part of the mechanism to accomplish the desired result. For example, such devices may contain oxygen electrodes which are oxygen reducing cathodes in which oxygen is catalytically electroreduced. Alternatively, such devices may contain oxygen electrodes which catalyze the evolution of oxygen from water. In general, these electrodes are known in the art as oxygen electrodes. Thus, metal-oxygen batteries, metal-air batteries, fuel cells, electrolyzers, metal electrowinning devices, etc., are among the well-known electrochemical devices which may contain oxygen electrodes. Typically, such devices contain electrocatalyst materials at one or more of their electrodes and precious metals, such as platinum (on carbon support) and silver (on carbon and other supports), are frequently employed as electrocatalysts.

In addition, various electrocatalytic alloys, compounds and compound mixtures have been developed for these electrochemical devices to achieve more desirable systems. For example, U.S. Pat. No. 3,536,533 (Kitamura) describes the use of an alloy of gold, silver, palladium and at least one of platinum, rhodium and ruthenium as a fuel cell electrode electrocatalyst, and U.S. Pat. No. 3,305,402 (Jones et al) describes the use of a combination of platinum and ruthenium oxides as an electrocatalyst. However, both references describe these catalysts as fuel cell anode (or fuel oxidation) catalysts. O'Grady et al, Technical Report No. 37, "Ruthenium Oxide Catalysts for the Oxygen Electrode," Contract No. N0014-67-A-0404-0006 (AD-779-899) Office of Naval Research, May, 1974 (National Technical Information Service) describes the use of ruthenium oxide as an electrochemical catalyst for both the generation of oxygen and the reduction of oxygen. U.S. Pat. No. 3,405,010 (Kordesch et al) teaches that spinel type electrode catalysts have been found to produce better activation of the electrode and improved electrolyte repellency of the electrode by the inclusion of ruthenium.

The foregoing prior art describes various types of electrodes including those which utilize iridium and/or ruthenium-containing catalysts. However, none of these references teaches or renders obvious the electrochemical devices of the present invention having the specified pyrochlore type compounds as the electrocatalysts.

Heretofore, many pyrochlore compounds such as the pyrochlore compounds $Pb_2Ru_2O_{7-y}$ (lattice parameter of 10.253Å), $Pb_2Ir_2O_{7-y}$ (lattice parameter of 10.271Å), $Bi_2Ir_2O_{7-y}$, $Bi_2Rh_2O_{7-y}$, $Pb_2Rh_2O_{7-y}$, $Pb_2Pt_2O_{7-y}$ and $Cd_2Re_2O_{7-y}$, commonly referred to as lead ruthenate, lead iridate, bismuth iridate, bismuth rhodate, lead rhodate, lead platinate and cadmium rhenate, respectively, have been known. For example, Longo, Raccah and Goodenough, Mat. Res. Bull., Vol. 4, pp. 191-202, (1969) have described the compounds $Pb_2Ru_2O_{7-y}$ and $Pb_2Ir_2O_{7-y}$ and their preparation at elevated temperatures which are in excess of 700° C. Sleight, Mat. Res. Bull., Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271Å) and their preparation at 700° C. and 3000 atmospheres of pressure. U.S. Pat. No. 3,682,840 (Van Loan) describes the preparation of lead ruthenate at temperatures of 800° C. and higher. These references do not teach that lead-rich compounds used in the present invention exist or that they may be prepared by solid state techniques at temperatures below about 600° C. in an oxygen-containing environment. Further, they do not teach that the known pyrochlore compounds may be useful as electrocatalysts in electrochemical devices such as in the present invention.

U.S. Pat. Nos. 3,769,382 (Kuo et al) and 3,951,672 (Langley et al) both disclose the preparation of lead ruthenate and lead iridate using various techniques at temperatures of at least about 600° C., and preferably at higher temperatures. However, these references fail to recognize that the lead-rich pyrochlores used in the present invention are obtained at generally lower temperatures or that such pyrochlores have improved physical properties. Further, these references also fail to teach or render obvious the use of any pyrochlore compounds as electrocatalysts in electrochemical devices such as in the present invention.

Bouchard and Gillson, Mat. Res. Bull., Vol. 6, pp. 669-680 (1971) describe $Bi_2Ru_2O_7$ and $Bi_2Ir_2O_7$ preparation and properties, including the fact that these compounds have high conductivity and small Seebeck coefficients. However, there is no teaching that these compounds are useful electrocatalysts in electrochemical devices. Derwent's Basic Abstract Journal, Section E, Chemdoc, Week No. Y25, Abstract No. 320 (August 17, 1977), Derwent Accession No. 44866Y/25 describes electrodes for electrolysis of alkaline and carbonate solutions which comprise nickel-plated steel strips coated with high conductivity layers containing $Cd_2Re_2O_7$, $Pb_2Re_2O_{7-y}$ or $Ni_2Re_2O_7$. These compounds are prepared by impregnating perrhenic acid and a metal nitrate such as Cd nitrate onto a nickel strip and baking at 350° C. However, these compounds are all rhenates and are not included in the present invention electrochemical devices due to their relative inferiority because of their strong tendency to oxidize to perrhenates ($Re^{7+}$) and to dissolve in typical electrolyte systems. National Bureau of Standards, Wash. D.C. Inst. for Mat. Research, Abstract of Rept. No. NBSIR-75-742 (1975) describes the use of mixed oxides as oxygen-reducing electrocatalysts in acid fuel cells, including the use of barium ruthenate. However, of all materials suggested for such electrocatalysts, none are of the pyrochlore type structure used in the electrochemical devices of the present invention. Thus, it should be noted that, for example, barium ruthenate is not a pyrochlore whereas lead ruthenate, used in the present invention, is a pyrochlore.

In summary, there exists a formidable body of prior art describing the existence of various pyrochlores, their potential uses including uses as dielectric materials, and describing various metals and metal oxides as electrocatalyst materials. Notwithstanding such prior art, there is no suggestion or teaching that (a) the lead-rich pyrochlore compounds used in the present invention even exist, or that (b) the specific pyrochlores used in the present invention, including known pyrochlores, may be useful electrocatalyst materials in electrochemical devices.

DESCRIPTION OF THE INVENTION

The present invention is directed to electrochemical devices having oxygen electrodes containing pyrochlore type electrocatalyst material. These electrocatalyst materials are any one or more electrically conductive pyrochlore type compounds of the following formula:

$$A_2B_2O_{7-y} \tag{1}$$

wherein A is any of the known pyrochlore structure metal cations, B is a pyrochlore structure metal cation at least a major portion of which is selected from the group consisting of one or more of Ru, Rh, Ir, Os, Pt, Ru-Pb mixtures and Ir-Pb mixtures (as will be more fully understood from the discussion of Formula (2) below), and wherein y is greater than or equal to zero and less than or equal to about 1.0. By "a major portion" is meant throughout this application an amount equal to or greater than 50 atomic percent. Desirably, A is a pyrochlore structure metal cation at least a major portion of which is selected from the group consisting of one or more of Pb, Bi and Tl. The variable B is desirably a pyrochlore structure B-type metal cation at least a major portion of which is selected from the group consisting of one or more of Ru, Rh, Ir, Ru-Pb mixtures and Ir-Pb mixtures. Preferably, A is selected from the group consisting of Pb, Bi and Tl. Preferably, B is selected from the group consisting of Ru, Rh, Ir, Os, Pt, Ru-Pb mixtures and Ir-Pb mixtures.

A preferred group of pyrochlore compounds which are included in Formula (1) above are novel lead-rich compounds having the following formula:

$$Pb_2[M_{2-x}Pb_x]O_{7-y} \tag{2}$$

wherein M is selected from the group consisting of Ru, Ir and mixtures thereof, and wherein x is greater than zero and less than or equal to about 1.2 and y is as defined above, i.e. is greater than or equal to zero and less than or equal to about 1.0.

Desirably, the variable x in Formula (2) is within the range of about 0.1 to about 1.0, preferably about 0.25 to about 0.8. Also, the variable y in both Formula (1) and Formula (2) is, as mentioned, within the range of about 0 to about 1.0. This variable represents an average value and takes into account the fact that a fraction of anion sites may be vacant in the crystal structure.

The compounds of the present invention, as represented by Formulas (1) and (2) above, as mentioned, display the pyrochlore crystal structure. Pyrochlore structure oxides are represented by the general formula $A_2B_2O_6O'$ wherein A and B are metal cations. A detailed description of their crystallographic structure may be found in *Structural Inorganic Chemistry*, Fourth Edition by A. F. Wells, Clarendon Press, Oxford, 1975. Briefly, oxides of this type display a face-centered cubic structure having a unit cell dimension of about 10A. The B cations are octahedrally coordinated by oxygen anions (O). The structure framework is formed by a three-dimensional array of these corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework." The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shared octahedra. The A cations reside in the center of these puckered hexagonal rings and are coordinated by the six O anions which define the rings plus two more O' cations at a slightly different distance. These O' anions reside at the center of the large holes in the octahedral framework. It is the O' anions which may be partially or totally absent, leading to the general pyrochlore oxide formula $A_2B_2O_{7-y}$ where $0 \leq y \leq 1$. Thus, the compounds of the present invention are referred to as pyrochlore compounds, albeit some (e.g., those of Formula (2) above) are not stoichiometric pyrochlores, but rather are lead-rich compounds of the formulas above.

It has been discovered that the pyrochlore compounds of Formula (2) above used in the electrochemical devices of the present invention exhibit an expanded lattice, believed to be a result of the increased amount of lead in the crystal structure. Although merely a hypothesis at the present time, it is believed that there may exist a direct correlation between the extent of expansion of the lattice and the amount of excess lead (relative to a lead to metal M ratio of 1.0:1.0) in the crystalline structure. Thus, it is believed that all things otherwise being equal, the greater the lattice parameter, the greater the amount of lead and therefore the larger the variable x in the formula representing the compounds of the present invention. This is supported by the fact that all compounds of Formula (2) above used in the present invention which have been prepared and lattice parameters determined do indeed exhibit expanded lattices.

The novel lead-rich pyrochlore compounds of Formula (2) above used in the electrochemical device of the present invention are prepared by solid state reaction. This solid state synthesis of the lead-rich pyrochlore type of compounds is achieved at elevated temperatures below about 600° C. by reacting a powdered lead source and a powdered metal source selected from the group consisting of ruthenium sources and iridium sources in an oxygen-containing environment. Generally, the oxygen-containing environment may be created either by including as one or more of the reactants an oxygen-containing compound, or by reacting the reactants in an oxygen-containing atmosphere. Preferably, the oxygen-containing environment is achieved by reacting one or more oxygen-containing reactants in an oxygen-containing atmosphere, e.g. air or oxygen.

The powdered lead source and the powdered metal source may be selected from any of those which release or contribute the lead or metal at elevated temperatures for reaction. Desirably, the lead source is lead nitrate or lead oxide, and is preferably lead nitrate. The metal source may be selected from elemental ruthenium and iridium, and the ruthenium and iridium salts such as the chlorides of ruthenium and iridium, the nitrate of ruthenium, and the oxides of ruthenium and iridium. The metal source is desirably selected from the nitrate of ruthenium, the chloride of iridium and the oxides of ruthenium and iridium, and is preferably selected from ruthenium nitrate and iridium oxide.

In general, the lead source and the metal source are employed in an amount so as to achieve initial reactant lead to metal ratio of at least about 1.0:1.0. Desirably, this ratio is within the range of about 1.1:1.0 to about 10:1.0. In the preferred embodiments, the lead to metal ratio is about 1.3:1.0 to about 5:1.0. As a practical matter, the reactant mixture may contain a lead to metal ratio appreciably higher than the final reacted product. After reaction, this excess lead can be removed by techniques described below. Thus, employing an excess of lead in the reactant mixture insures that the pyrochlore product incorporates the maximum amount of lead possible and therefore minimizes the expensive precious metal content.

The lead source reactant and the metal source reactant are combined in powder form and may be blended by any known technique, e.g. mechanical blending. The combined reactants are then fired in the mentioned oxygen-containing environment, e.g. in a conventional furnace, for a period of time sufficient for the reactants to produce a desired amount of product compound of the present invention. In general, elevated temperatures below about 600° C. may be used. Thus, any temperature below this temperature which causes the reaction to occur may be used and the minimum reaction temperature may be dictated by the kinetic limitations of the solid state reaction. Desirably, the temperature is in the range of about 275° C. to about 575° C. and is preferably about 300° C. to about 500° C. It is believed that the lower the temperature within this range, the greater the degree of lead enrichment of product compound, provided that the reactant mixture has access to a sufficiently large reserve of lead so that the product can take up the maximum amount of lead that can be incorporated into the structure. Stated another way, at any of the temperatures of reaction discussed in this invention there is a continuum of stable pyrochlore phases having the formula $Pb_2[M_{2-x}Pb_x]O_{7-y}$ where x will range all the way down to zero. To insure synthesis of a pure lead-rich pyrochlore, the appropriate excess of lead (relative to a lead to metal ratio of 1.0:1.0) should be provided such that the desired value of x is obtained in the final product.

The length of time to which the firing is maintained is a matter of choice, and within limits, the longer the firing time, the greater the extent of reaction and, consequently, the higher the purity of the reacted product obtained. As a practical matter, a significant amount of reaction is obtained after firing for a few hours, and generally a firing time of about 8 to about 120 hours is advantageous, more firing time serving no useful purpose.

Optional treatment may be employed either before or after firing the lead source and the metal source, as desired. For example, pretreatment may be used to obtain more highly reactive reactants. Thus, reactants including a metal source, and, for example, lead nitrate, may be dissolved in aqueous solution and coprecipitated out in aqueous ammonium hydroxide to produce lead nitrate and a hydrated metal source which is a more reactive mixture than is achieved when conventional solid state preparative techniques are employed. This pretreatment is illustrated in the examples below. Additionally, enhanced reaction rate and/or physical characteristics of the product compound may be achieved by grinding and firing and then regrinding solid product and refiring. Also, impurities such as certain lead oxides may be removed by leaching, as illustrated in the examples.

The pyrochlore compounds of Formula (1) used in the present invention other than those of Formula (2) described above are known and may be prepared by known techniques, many of which are disclosed in the prior art references cited above. Also, the above techniques described for the preparation of the lead-rich pyrochlores of Formula (2) above may be used provided higher temperatures, e.g. 700° to 900° C., are used.

The pyrochlore compounds employed in the electrochemical devices of the present invention are those of generic Formula (1) above including those of subgenus Formula (2) above and may comprise mixtures of the lead-rich compounds of Formula (1) with other (non lead-rich) compounds of Formula (1).

Specific non-limiting examples of the Formula (1) pyrochlore compounds of the present invention, presented for illustrative purposes only, are:

$Pb_2Ru_2O_{7-y}$ (3)

$Pb_2Rh_2O_{7-y}$ (4)

$Pb_2Ir_2O_{7-y}$ (5)

$Pb_2Os_2O_{7-y}$ (6)

$Pb_2Pt_2O_{7-y}$ (7)

$Bi_2Ru_2O_{7-y}$ (8)

$Bi_2Rh_2O_{7-y}$ (9)

$Bi_2Ir_2O_{7-y}$ (10)

$Bi_2Pt_2O_{7-y}$ (11)

$Tl_2Ru_2O_{7-y}$ (12)

$Tl_2Rh_2O_{7-y}$ (13)

$Tl_2Ir_2O_{7-y}$ (14)

$Tl_2Os_2O_{7-y}$ (15)

$Tl_2Pt_2O_{7-y}$ (16)

$BiAgRu_2O_{7-y}$ (17)

$[Pb_aBi_{2-a}]Ru_2O_{7-y}$ (18)

wherein a is a value such that $0 < a < 2.0$, $[Pb_aBi_{2-a}]Ir_2O_{7-y}$ (19)

$[Pb_aBi_{2-a}][Ir_bRu_{2-b}]O_{7-y}$ (20)

wherein b is a value such that $0 < b < 2$ and a is as defined.

Many other variations using mixtures of metals contained in the above examples to arrive at additional examples of pyrochlore compounds useful in the present invention are now apparent. Additionally, the compounds used in the present invention may contain minor amounts of B-type cations in the crystalline structure along with the above recited B-type cations. The following are exemplary:

$$Bi_2[Ru_{2-c}Ti_c]O_{7-y} \tag{21}$$

wherein c is a value such that $0 < c < 1$, $$Bi_2[Rh_{2-c}Sn_c]O_{7-y} \tag{22}$$

$$Pb_2[Ru_{2-c}Sn_c]O_{7-y} \tag{23}$$

$$Pb_2[Rh_{2-c}Ta_c]O_{7-y} \tag{24}$$

and the like.

Specific examples of the lead-rich pyrochlore compounds of Formula (2) used in the device of the present invention are:

$$Pb_2[Ru_{2-x}Pb_x]O_{7-y} \tag{25}$$

and $$Pb_2[Ir_{2-x}Pb_x]O_{7-y} \tag{26}$$

wherein the variables x and y are as defined.

The electrochemical device of the present invention contains one or more of the mentioned compounds as an electrocatalyst material. More specifically, the device is one which contains an oxygen electrode containing one or more of the mentioned compounds as the electrocatalyst material. The device, therefore, may be any electrochemical device having this oxygen electrode, including metal-oxygen batteries, metal-air batteries, other types of batteries containing one or more oxygen electrodes, fuel cells, and electrolyzers. These include both the oxygen-reducing electrode devices as well as the oxygen-producing electrode devices. For example, these devices include those which contain oxygen-reducing cathodes which consume or electrocatalytically reduce oxygen in an oxygen containing gas. Also included are the oxygen-producing anode devices wherein oxygen is liberated or produced by electrocatalytic oxidation of oxygen-bearing compounds. The devices of the present invention contain the mentioned oxygen electrode or electrodes and otherwise may be the same as conventional devices which are well known to the artisan. Thus, the present invention contemplates all known electrochemical devices having oxygen electrodes except that one or more of the above compounds is used as the electrocatalyst material of the oxygen electrodes.

The present invention will be more fully appreciated in view of the description of the drawings and the following examples. The examples are, however, presented for illustrative purposes only, and the present invention should not be construed to be limited thereto:

BRIEF DESCRIPTION OF THE DRAWINGS

FIG. 1 illustrates an oxygen reduction Voltage vs. Current Density graph for $Pb_2Ru_2O_{7-y}$ electrocatalyst in oxygen and in nitrogen;

FIG. 2 illustrates an oxygen reduction Voltage vs. Current Density graph for $Pb_2Ru_2O_{7-y}$ electrocatalyst and for platinum on carbon electrocatalyst;

EXAMPLE 1

Figure 3:
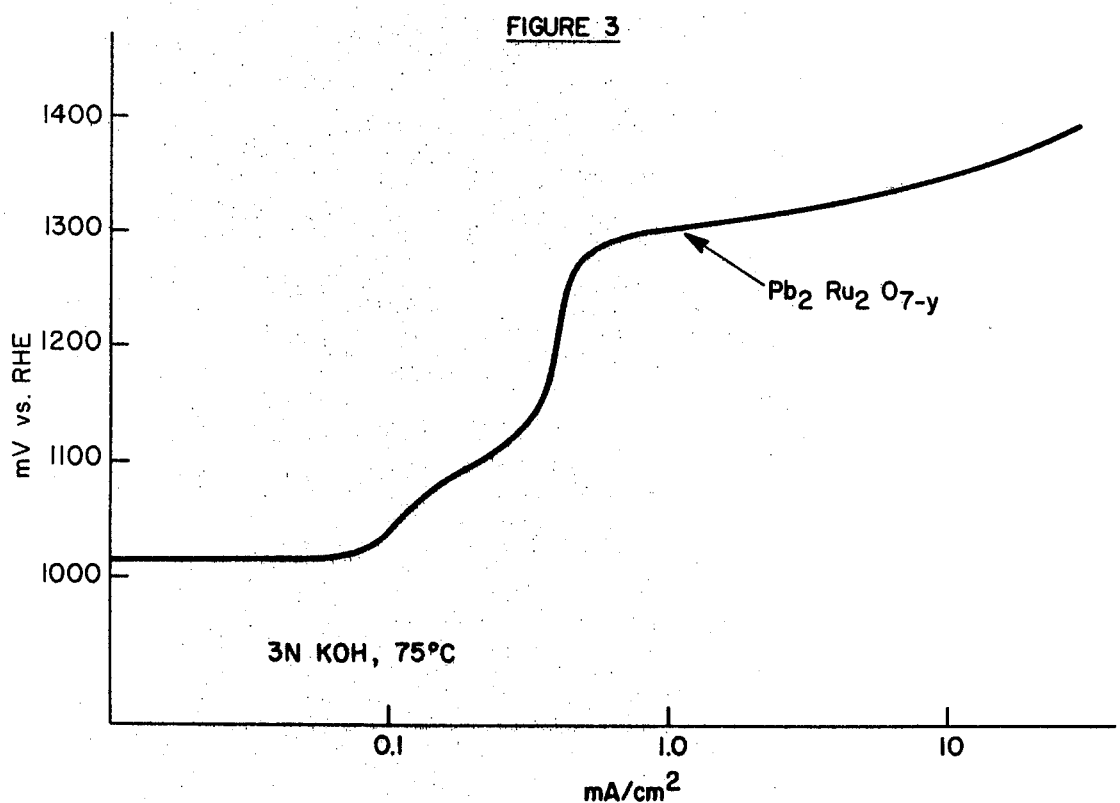
FIG. 3 shows an oxygen evolution curve for $Pb_2Ru_2O_{7-y}$ prepared in accordance with Example 1.

The electrocatalyst compound $Pb_2Ru_2O_{7-y}$ is prepared as follows:

A mixture of powdered, mechanically blended $Pb(NO_3)_2$ and $RuO_2$ in amounts so as to achieve a lead to ruthenium molar ratio of approximately 1.5:1.0 is reacted at 850° C. for 20 hours in air with one interruption for regrinding. The resulting reacted powder is washed with an alkaline solution to leach out any excess PbO. X-ray diffraction indicates that the reacted and washed powder is single phase $Pb_2Ru_2O_{7-y}$. The surface area is determined, by the BET $N_2$ absorption method, to be about 3 m²/g.

To illustrate the utility of this $Pb_2Ru_2O_{7-y}$ compound, performance curves for the electrocatalytic reduction and evolution of oxygen at 75° C. in 3N KOH are obtained using the $Pb_2Ru_2O_{7-y}$ compound and using platinum supported (10% by weight) on active carbon. The platinum on carbon electrode is typical of conventionally used supported noble metal electrocatalysts. In these tests, the material is fabricated into test electrodes consisting of the catalyst, a binder, a wetproofing agent and a support. Teflon serves as both a binder and wetproofing agent for all the electrodes tested. Gold expanded metal screen is used as the support.

Electrodes are fabricated by mixing a weighed amount of catalyst with a few drops of water, adding a measured volume of Teflon 42 suspension, and mixing vigorously to precipitate the Teflon. The gummy product is then spread on a weighed gold Exmet screen and is pressed dry between filter paper. The electrode is then cold pressed for 0.5 min. at 200 p.s.i., is allowed to air dry for 30 min., and is then hot pressed at 325° C., 500 psi for 0.5 min. After cooling, the electrode is weighed to determine its loading and then placed in the electrochemical cell for testing.

The electrochemical half-cell used for testing is of the interface maintaining type and consists of a jacketed liquid phase cell compartment and a gas phase cell compartment. The liquid side contains the platinum wire counter electrode, a saturated calomel reference electrode (in contact by Lugin capillary), and magnetic stirrer. The gas side contains the gas (oxygen) inlet and outlet and a stopcock to drain off any condensate. The working electrode is held in place (between the two compartments) between two Teflon disks with a gold current collector pressing against it.

The cell is connected to a Princeton Applied Research Model 173 potentiostat with a programmer and logarithmic current converter. Constant rate potential sweep measurements are conducted. Outputs of potential and log of current are recorded on an x-y plotter, and the resulting potential vs. log current density plot, referred to as a performance curve, is used to evaluate the electrode activity. These results are shown in the Voltage-Current Density Graph of FIG. 1 which shows an electrocatalytic performance curve for the reduction of oxygen at 75° C. in 3N KOH using $Pb_2Ru_2O_{7-y}$, prepared as above, as the catalyst. Curve 1 represents the activity of the electrode when oxygen is continually supplied to it. When the cell is purged with nitrogen and the performance curve is run with nitrogen continually supplied to the electrode, the catalytic activity is eliminated as shown by curve 2. This demonstrates that the activity exhibited by the electrode in oxygen (curve 1) is truly catalytic in nature (i.e. it is not just the electrochemical reduction of the active material taking place).

FIG. 2 (Voltage-Current Density) compares the oxygen electroreduction performance curve of the $Pb_2Ru_2O_{7-y}$ with that of 10% (by weight) platinum supported on active carbon (Pittsburgh RB Carbon). The platinum on carbon electrode is typical of conventionally used supported noble metal electrocatalysts. As the graph illustrates, the lead ruthenate electrode is competitive with the platinum on carbon electrode.

FIG. 3 shows a performance curve for the evolution of oxygen in 3N KOH at 75° C. using $Pb_2Ru_2O_{7-y}$, prepared in accordance with the procedure of Example 1, as the catalyst. Good performance is observed over a range of current densities.

EXAMPLE 2

The electrocatalyst compound $Pb_2Ru_2O_{7-y}$ is again prepared using $Pb(NO_3)_2$ and $RuO_2$ but using a lead to ruthenium molar ratio of 2:1 and lower temperatures in order to obtain a product having increased surface area. The ground, blended mixture was fired in air for 276 hours at 400° C., 156 hours at 500° C., 45 hours at 600° C. and 53 hours at 700° C. with 15 interruptions for regrinding. The resulting powder is found to contain $Pb_2Ru_2O_{7-y}$ and PbO. The PbO is leached out with 9N KOH, leaving only single phase $Pb_2Ru_2O_{7-y}$ having a surface area of 6 $m^2/g$, about double that of the product of Example 1.

Figure 4:
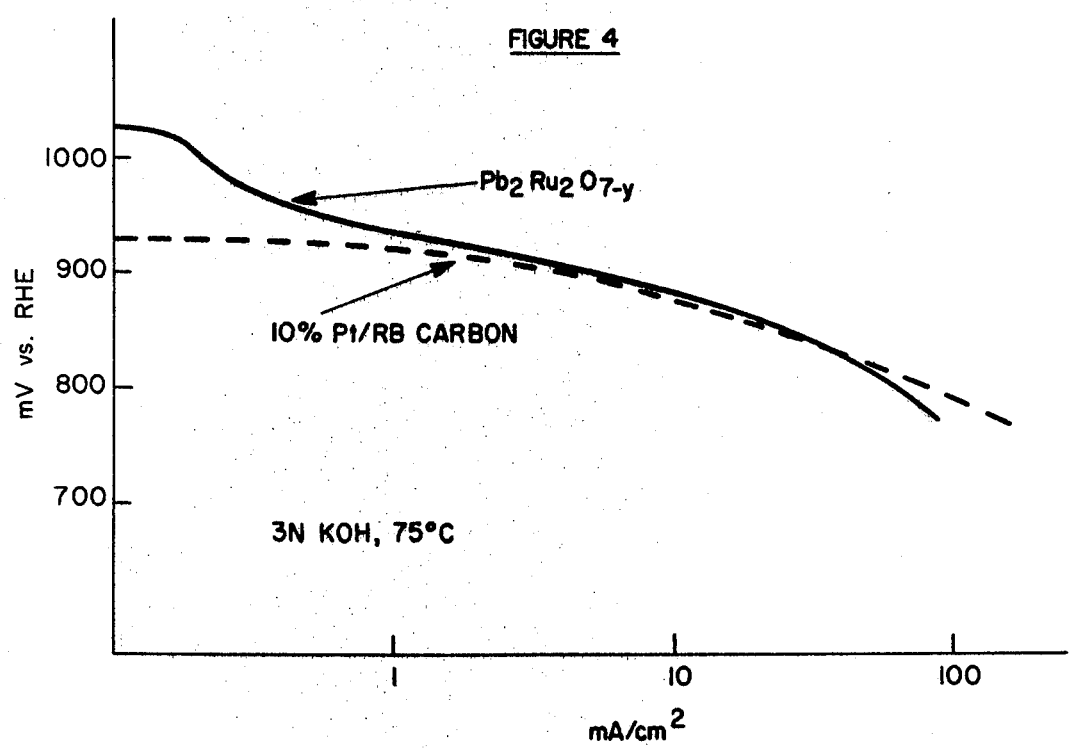
FIG. 4 shows as oxygen reduction curve for $Pb_2Ru_2O_{7-y}$ prepared in accordance with Example 2 and for platinum on carbon.

The oxygen electroreduction performance curve for the electrocatalytic reduction of oxygen at 75° C. in 3N KOH with this 6 $m^2/g$ $Pb_2Ru_2O_{7-y}$ is shown in the Voltage-Current Density Graph of FIG. 4 along with the performance curve for 10% (by weight) platinum on active carbon. It is clear that a substantial improvement in electrocatalytic activity is obtained by increasing the surface area of the lead ruthenate.

EXAMPLE 3

A mixture of compounds having the formulas $Pb_2[Ru_{2-x}Pb_x]O_{7-y}$ and $Pb_2Ru_2O_{7-y}$ is prepared as follows:

A mechanically blended mixture of $Pb(NO_3)_2$ and $RuO_2$ in a lead to ruthenium molar ratio of 4:1 is fired at 400° C. in air for 25 hours with 2 regrindings. The excess lead, $Pb_3O_4$, is leached away with acetic acid. The resulting pyrochlore oxides have a surface area of 9 $m^2/g$, and X-ray diffraction reveals that the oxide powder contains two phases, one corresponding to $Pb_2Ru_2O_{7-y}$ and the other corresponding to $Pb_2[Ru_{2-x}Pb_x]O_{7-y}$. It is believed that the lower temperature of synthesis results in a stable compound in which a fraction of the ruthenium ($Ru^{+4}$) is substituted by lead ($Pb^{+4}$) ions. Thus, in the formula of the lead rich compounds:

$$Pb_2[M_{2-x}Pb_x]O_{7-y} \qquad (2),$$

it is believed that the $Pb_2$ component consists of $Pb^{+2}$ ions whereas the $Pb_x$ component consists of $Pb^{+4}$ ions. The $Pb^{4+}$ ion has a larger ionic radius (0.78Å) than the $Ru^{4+}$ ion (0.62Å). Therefore, a larger unit cell dimension of the crystal lattice is expected to be obtained if $Pb^{4+}$ were to substitute for $Ru^{4+}$. In fact, a resulting expanded lattice is confirmed by X-ray diffraction.

The Miller indices and interplanar spacings for the X-ray diffraction patterns of pure $Pb_2Ru_2O_{7-y}$ and for the $Pb_2[Ru_{2-x}Pb_x]O_{7-y}$ lead-rich compound of the product of Example 3 are shown in Tables I and II, respectively. As can be seen by comparing the tables, significant differences exist for the two types of compounds.

TABLE I

X-Ray Diffraction Powder Pattern for $Pb_2Ru_2O_{7-y}$

| h k l | d(Å) |
|---|---|
| (111) | 5.92 |
| (311) | 3.09 |
| (222) | 2.96 |
| (400) | 2.563 |
| (331) | 2.352 |
| (333) | |
| (511) | 1.973 |
| (440) | 1.813 |
| (531) | 1.733 |
| (622) | 1.546 |
| (444) | 1.480 |
| (553) | |
| (731) | 1.335 |
| (800) | 1.282 |
| (733) | 1.253 |
| (662) | 1.176 |
| (840) | 1.146 |
| (844) | 1.046 |

TABLE II

X-Ray Diffraction Powder Pattern For $Pb_2^{2+}[Ru_{2-x}Pb_x^{4+}]O_{7-y}$

| h k l | d(Å) |
|---|---|
| (111) | 6.06 |
| (222) | 3.02 |
| (400) | 2.60 |
| (331) | 2.38 |
| (440) | 1.84 |
| (622) | 1.57 |
| (444) | 1.50 |
| (800) | 1.30 |

Figure 5:
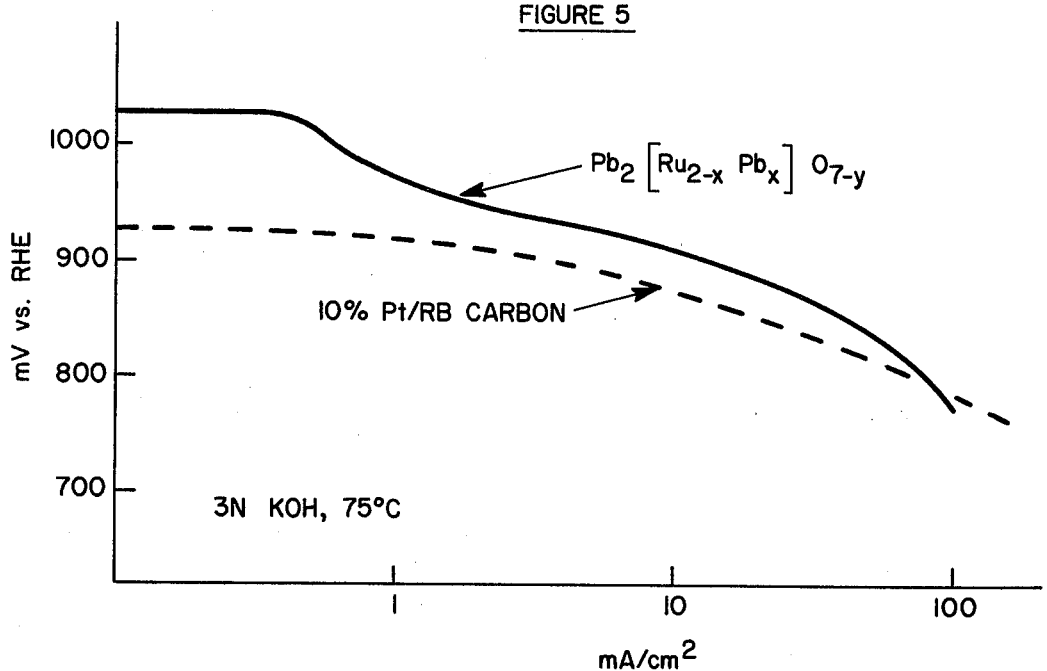
FIG. 5 illustrates an oxygen reduction curve for the lead rich pyrochlore of Example 3 and for platinum on carbon.

Performance curves for the electrocatalytic reduction of oxygen at 75° C. in 3N KOH using the lead-rich compound-containing catalyst of Example 3 and using conventional platinum (10% by weight) on active carbon, are obtained. The results are shown in the Voltage-Current Density Graph of FIG. 5 and establish that electrochemical devices of the present invention having the lead-rich compound-containing catalyst of this Example as their oxygen electrode electrocatalyst have oxygen-reduction capability superior to a conventional supported platinum electrocatalyst in the tested environment.

EXAMPLE 4

The compounds of the present invention contain various amounts of lead which has replaced, in part, the ruthenium or iridium in the pyrochlore structure. The extent to which Ru is replaced by lead is determined by changing the temperature of synthesis provided an adequate amount of lead is present. It is found that the amount of Ru replaced by lead gradually increases with decreasing temperatures. This change in lead to ruthenium ratio is monitored by observing the increase in lattice parameter as more ruthenium is replaced by lead. In air, at atmospheric pressure and a temperature greater than approximately 675° C., $Pb_2Ru_2O_{7-y}$ becomes the equilibrium phase. $Pb_2Ir_2O_{7-y}$ becomes the equilibrium phase at temperatures slightly greater than 675° C. Thus, it is estimated that significant expansion of the pyrochlore structures occurs at synthesis temperatures at and below about 600° C. If synthesis temperatures as low as 300° C. (at 1 atmosphere of air) are employed, x may reach a maximum value of about 1.2 with very significantly expanded pyrochlore structures resulting.

EXAMPLE 5

Solid state synthesis of the lead-rich pyrochlore, e.g. $Pb_2[Ru_{2-x}Pb_x]O_{7-y}$, is facilitated by employing a coprecipitation technique such as follows:

$Pb(NO_3)_2$ and $Ru(NO_3)_3$ are combined in aqueous solution in a 2:1 molar ratio of lead to ruthenium. That is, about 5,241 grams of $Pb(NO_3)_2$ and about 2.27 grams of $Ru(NO_3)_3$ (as aqueous solution) are added to about 0.250 liters of $H_2O$. To this solution is added a large excess (about 0.125 liters) of 14.8N $NH_4OH$. A precipitate immediately appears and the suspension is stirred for ½ hour. The solids are found to be predominantly $Pb(NO_3)_2$ and hydrated ruthenium oxide. The suspension is then placed in an oven at 300° C. and left overnight so that evaporation to dryness and subsequent solid state reaction are achieved in one continuous step. The resulting oxide is then washed in alkali such as $NH_4OH$ or KOH or in acetic acid in order to leach out any excess lead oxide which is formed. The alkali or acid washing media may be heated in order to facilitate leaching of the lead oxide. In a typical synthesis, 3N KOH at 75° C. is used as the washing medium and the oxide is continually washed with fresh hot KOH and separated by filtration. The sequence is repeated (using fresh KOH for each washing) until lead can no longer be detected in the filtered washing medium. X-ray diffraction shows that the washed and dried product is a single phase crystalline material exhibiting the pyrochlore crystal structure. The indices and interplanar spacings for the X-ray diffraction reflections for this compound are given in Table III below. Comparison with the X-ray diffraction pattern of $Pb_2Ru_2O_{7-y}$ (given in Table I) shows that the compound of the present example has a crystal lattice that is expanded relative to $Pb_2Ru_2O_{7-y}$ and, thus, is a significantly different and new material. The lead to ruthenium ratio as determined experimentally by X-ray fluorescence, is 1.48±0.03:1.0. The formula for this particular pyrochlore may be expressed as $Pb_2[Ru_{1.61}Pb_{0.39}]O_{7-y}$.

Figure 6:
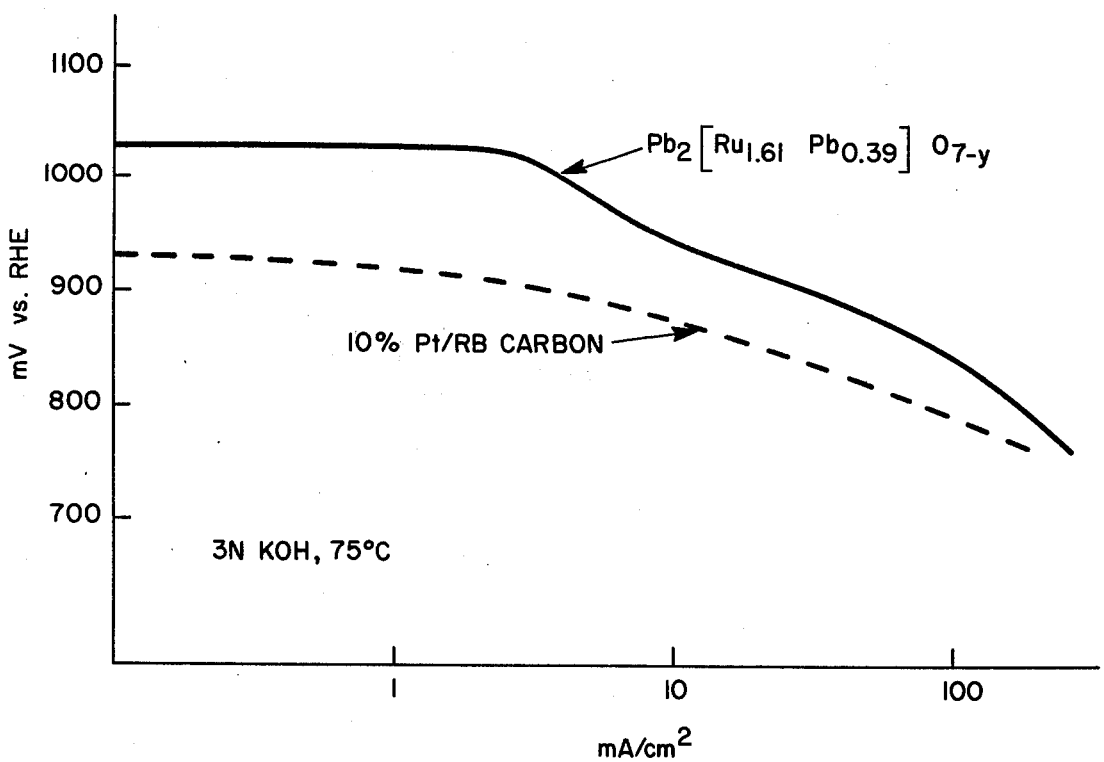
FIG. 6 illustrates an oxygen reduction curve for $Pb_2[Ru_{1.61}Pb_{0.39}]O_{7-y}$ and for platinum on carbon.

To illustrate the utility of the compound prepared in this Example, performance curves for the electrocatalytic reduction of oxygen at 75° C. in 3N KOH are obtained using the lead-rich compound and using platinum supported (10% by weight) on active carbon. The platinum on carbon electrode is typical of conventionally used supported noble metal electrocatalysts. The results are shown on the Voltage-Current Density Plot of FIG. 6 and establish that the pure lead-rich compound of the present invention has oxygen-reduction capability superior to a conventional supported platinum electrocatalyst in the tested environment.

TABLE III

| X-Ray Diffraction Powder Pattern for $Pb_2[Ru_{1.61}Pb_{0.39}]O_{7-y}$ ||
|---|---|
| h k l | d(A) |
| (111) | 6.01 |
| (222) | 3.02 |
| (400) | 2.60 |
| (331) | 2.39 |
| (333) (511) | 2.00 |
| (440) | 1.84 |
| (622) | 1.57 |
| (444) | 1.50 |
| (800) | 1.30 |
| (662) | 1.19 |
| (840) | 1.16 |

EXAMPLE 6

A lead-rich pyrochlore used as an electrocatalyst in the electrochemical device of the present invention is prepared by adding a large excess of $NH_4OH$ to an aqueous solution of lead nitrate and ruthenium nitrate in a 1:1 lead to ruthenium molar ratio. This suspension is evaporated to dryness and reacted in one continuous heating at 300° C. for about 16 hours. X-ray diffraction shows the material to have a pyrochlore structure characteristic of the lead-rich variety. Since a 1:1 molar mixture of lead to ruthenium is used in this preparation, excess lead oxide is not present, and the alkali leaching step is not necessary. Excess $RuO_2$ is detected as a trace phase in the X-ray diffraction pattern.

Figure 7:
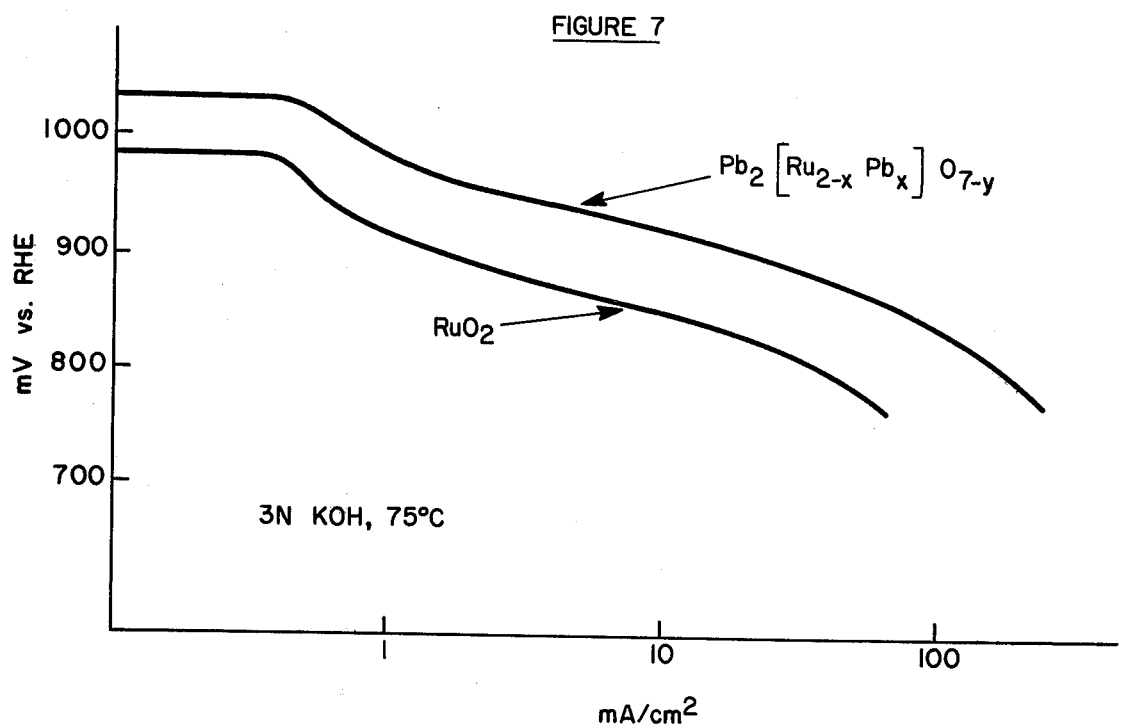
FIG. 7 illustrates an oxygen reduction curve for the lead rich lead ruthenate of Example 6 and for $RuO_2$.
Figure 8:
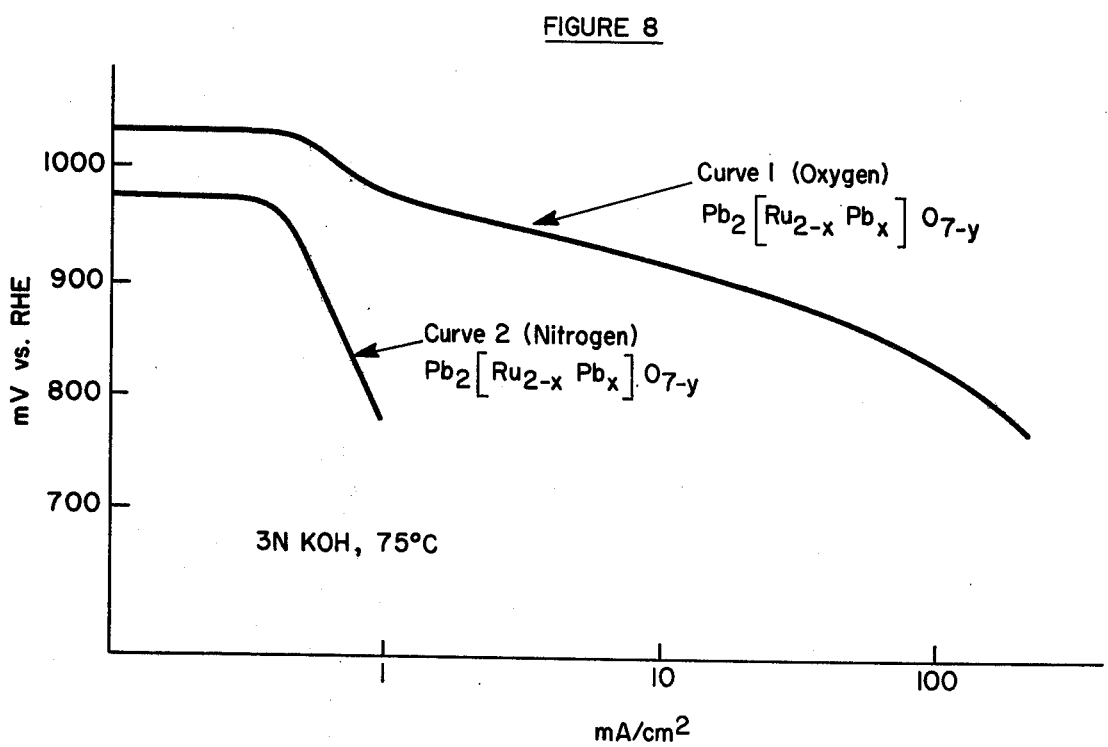
FIG. 8 illustrates an oxygen reduction curve for the lead rich lead ruthenate of Example 6 in oxygen and in nitrogen.

The product obtained by this procedure is tested for electrocatalytic activity in an electrochemical device in accordance with the procedure set forth in Example 1. The Voltage-Current Density Graph of FIG. 7 shows the performance curve for the electrocatalytic reduction of oxygen in 3N KOH at 75° C. with the lead rich pyrochlore of this Example. Also included in FIG. 7 is the performance curve for pure $RuO_2$ which has been heretofore recognized as an oxygen electrode. A comparison of the curves of FIG. 7 will show that the favorable electrochemical activity which is obtained with this electrode is not due to the presence of a minor phase of $RuO_2$. FIG. 8 compares the Voltage-Current Density Graphs of $Pb_2[Ru_{2-x}Pb_x]O_{7-y}$ when oxygen is continually supplied to the electrochemical cell (curve 1) as has been shown in FIG. 7 and when the cell is purged with nitrogen and the performance curve is run with nitrogen continually supplied to the cell (curve 2).

Figure 9:
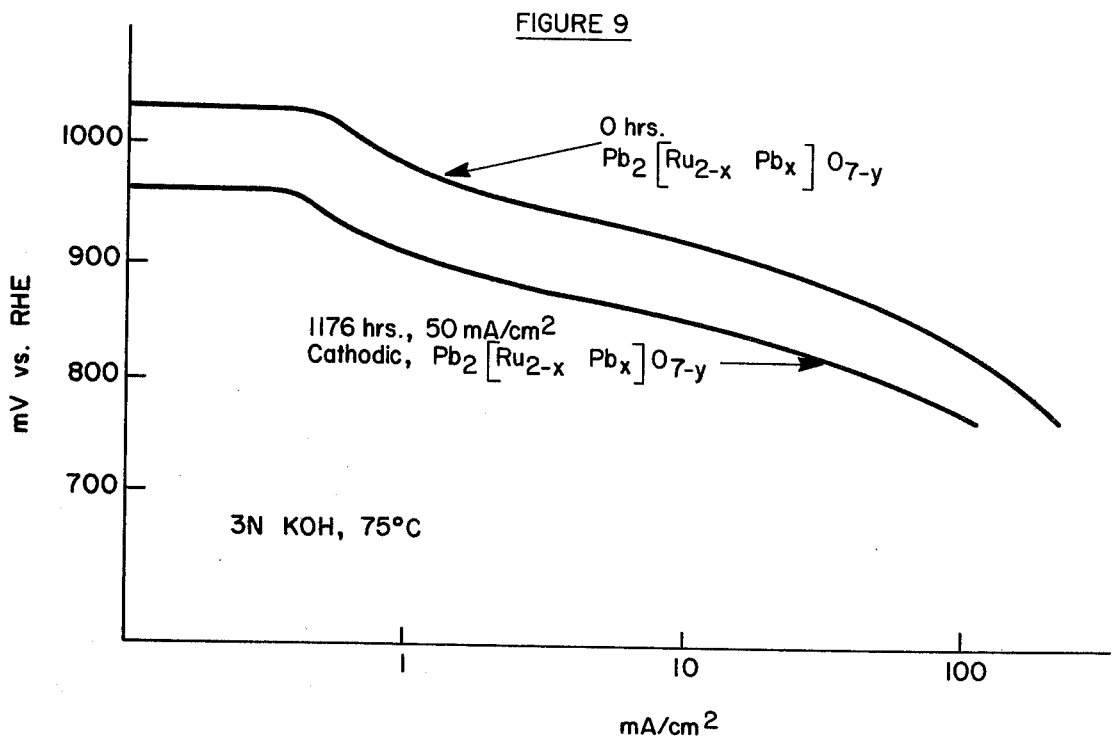
FIG. 9 illustrates an oxygen reduction curve for the same compound as FIG. 8 but includes an initial performance and a curve obtained after 1176 hours of operation.
Figure 10:
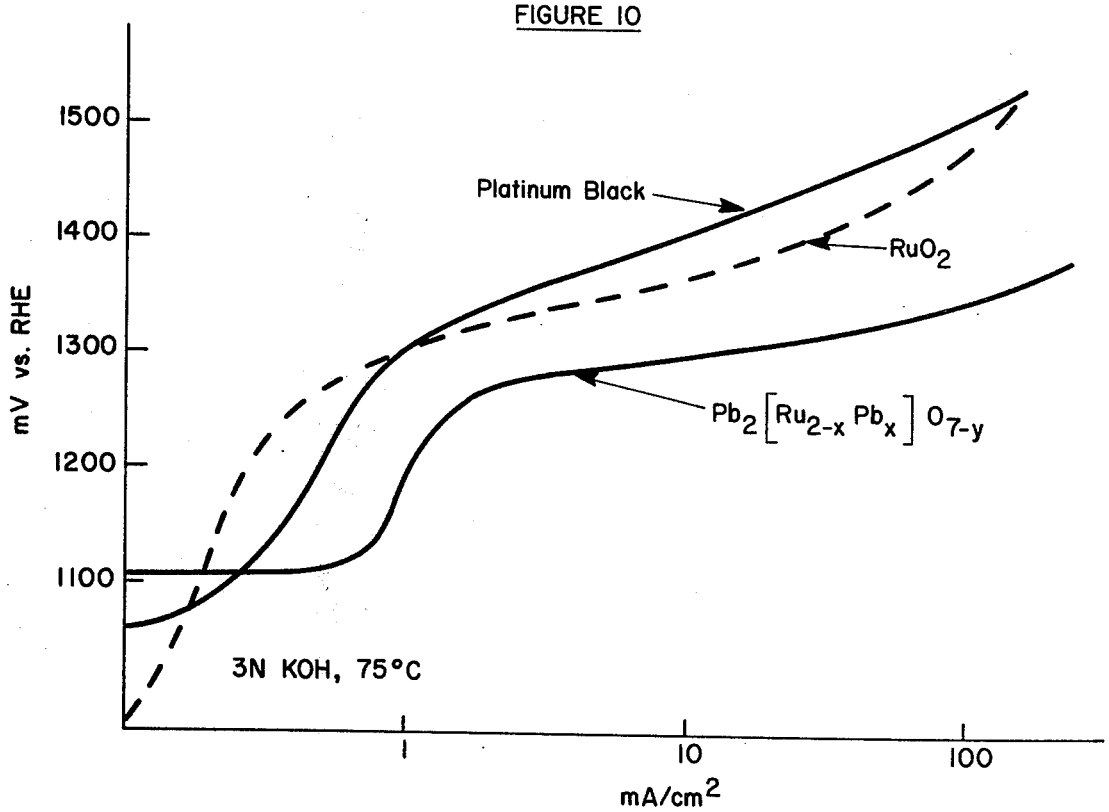
FIG. 10 shows oxygen evolution curves for the same $Pb_2[Ru_{2-x}Pb_x]O_{7-y}$ compound after 1176 hours of performance and for platinum black and $RuO_2$.

When the electrode is supplied with only nitrogen, the electrode activity is eliminated. This demonstrates that the activity exhibited by the electrode in oxygen is truly catalytic in nature and is not just the electrochemical reduction of the active material taking place. This particular electrode is next tested in the oxygen electroreduction mode for 1176 hours at a current density of 50 mA/cm$^2$ before the test is terminated in order to do additional experiments on the electrode. FIG. 9 shows the initial performance curve of the electrode as compared to the performance curve obtained after 1176 hours. After 1176 hours, the electrode is examined by X-ray diffraction. No change is detected in the X-ray pattern, thereby indicating that the lead-rich pyrochlore structure remains unchanged with use. After completion of the 1176 hour life test, this same electrode is cycled between 8 hour periods of oxygen reduction (25 mA/cm$^2$) and 16 hour periods of oxygen evolution (12.5 mA/cm$^2$) for an additional 266 hours, again without experiencing any serious loss of activity or any chemical or structural changes. FIG. 10 shows a performance curve for the evolution of oxygen in 3N KOH at 75° C. with the life tested electrode obtained at the 1176 hour mark. Also included for comparison are oxygen evolution performance curves for RuO$_2$ and platinum black. It is evident that the oxygen overpotential (anodic polarization) at any current density is much greater for platinum or RuO$_2$ than it is for the lead-rich pyrochlore, demonstrating that the lead-rich pyrochlore compound used in the electrochemical device of the present invention remains a superior electrocatalyst.

EXAMPLE 7

Figure 11:
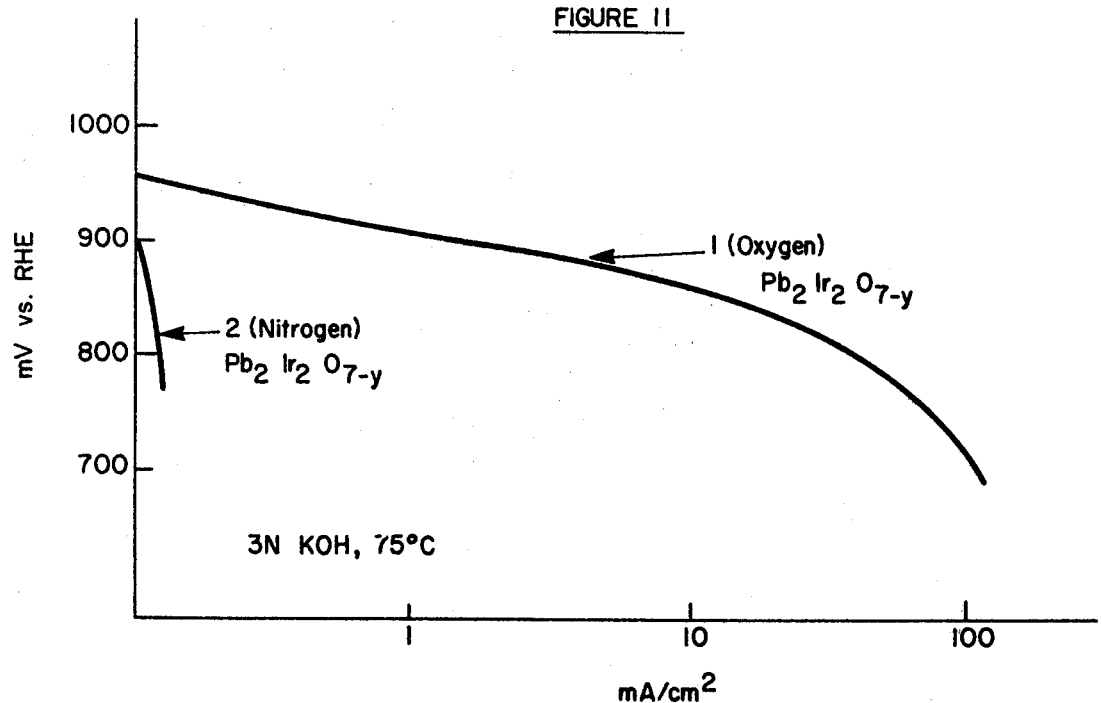
FIG. 11 shows an oxygen reduction curve for $Pb_2Ir_2O_{7-y}$ in oxygen and in nitrogen.

Lead iridate, Pb$_2$Ir$_2$O$_{7-y}$, is tested as an oxygen electrode in an electrochemical device of the present invention. FIG. 11 shows an electrocatalytic performance curve for the reduction of oxygen at 75° C. in 3N KOH using Pb$_2$Ir$_2$O$_{7-y}$ as the catalyst (curve 1). When the electrochemical cell is purged with nitrogen and the performance curve is run with nitrogen continually supplied (curve 2), the electrode activity is eliminated. This demonstrates that the activity exhibited by the electrode in oxygen is truly catalytic in nature.

Figure 12:
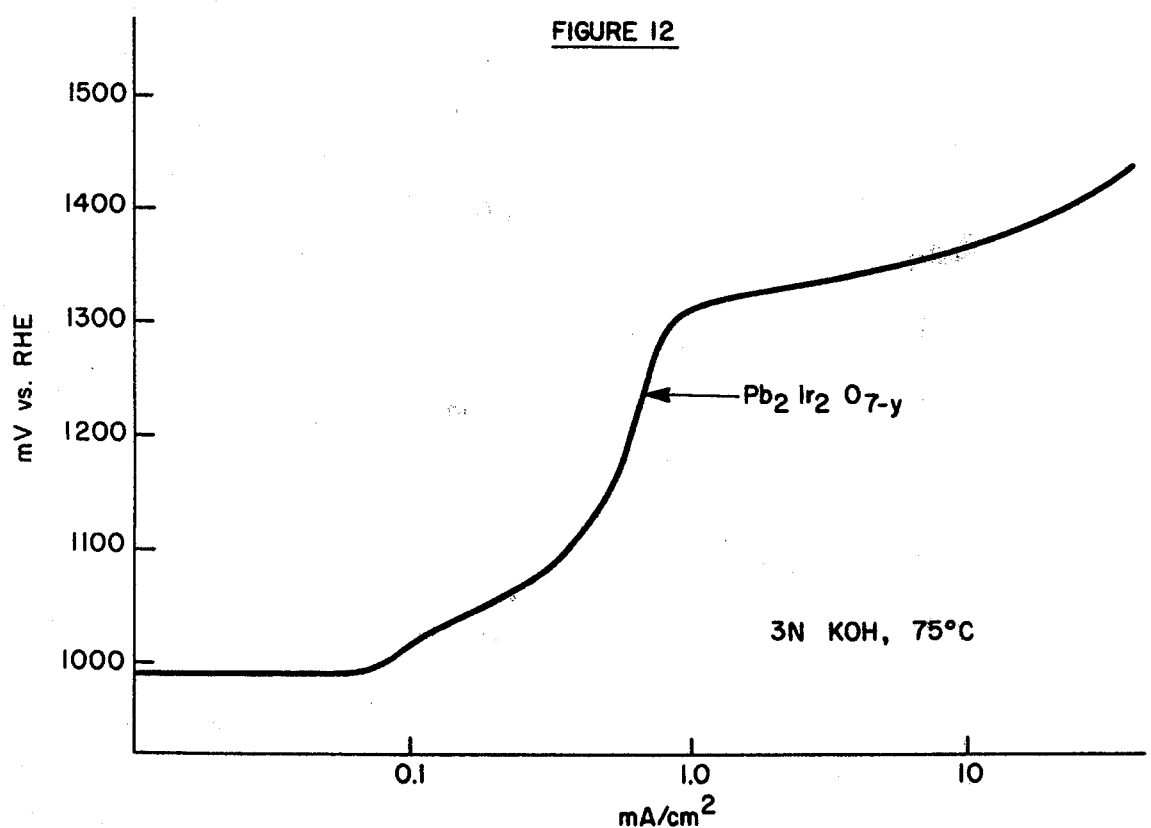
FIG. 12 shows an oxygen evolution curve for lead iridate.

FIG. 12 shows a performance curve for the evolution of oxygen in 3N KOH at 75° C. using Pb$_2$Ir$_2$O$_{7-y}$ as the catalyst in an electrochemical cell.

EXAMPLE 8

A lead iridate pyrochlore electrocatalyst having a lead rich composition, Pb$_2$[Ir$_{2-x}$Pb$_x$]O$_{7-y}$, is prepared as follows:

A mechanically blended mixture of Pb(NO$_3$)$_2$ and IrO$_2$ in a lead to iridium molar ratio of 3:1 is fired for 2 hours at 500° C., 71 hours at 600° C. and 27 hours at 700° C., all in air, with ten regrindings. The excess lead oxide (PbO) is leached away with 3N KOH at 70° C. The resulting pyrochlore oxide has a surface area of 0.8 m$^2$/g, and X-ray diffraction reveals that the oxide powder is a lead-rich pyrochlore having a crystal lattice which is expanded relative to Pb$_2$[Ir$_2$]O$_{7-y}$. The formula of the lead-rich phase may be expressed as Pb$_2$[Ir$_{2-x}$Pb$_x$]O$_{7-y}$. The Miller indices and interplanar spacings for the X-ray diffraction pattern of Pb$_2$Ir$_2$O$_{7-y}$ and for the compound of this example are shown in Tables IV and V, respectively. As can be seen by comparing the tables, significant differences exist for the two types of compounds.

TABLE IV

| X-Ray Diffraction Powder Pattern For Pb$_2$Ir$_2$O$_{7-y}$ | |
|---|---|
| h k l | d(A) |
| (111) | 5.9 |
| (311) | 3.10 |
| (222) | 2.96 |
| (400) | 2.568 |
| (331) | 2.356 |
| (333) | |
| (511) | 1.977 |
| (440) | 1.816 |
| (531) | 1.736 |
| (622) | 1.548 |
| (444) | 1.483 |
| (553) | |
| (731) | 1.337 |
| (800) | 1.284 |
| (733) | 1.255 |
| (662) | 1.178 |
| (840) | 1.148 |
| (844) | 1.048 |

TABLE V

| X-Ray Diffraction Powder For Pb$_2$[Ir$_{2-x}$Pb$_x$]O$_{7-y}$ | |
|---|---|
| h k l | d(A) |
| (222) | 2.979 |
| (400) | 2.582 |
| (331) | 2.371 |
| (440) | 1.828 |
| (622) | 1.557 |
| (444) | 1.491 |
| (800) | 1.291 |
| (662) | 1.183 |
| (840) | 1.155 |

Figure 13:
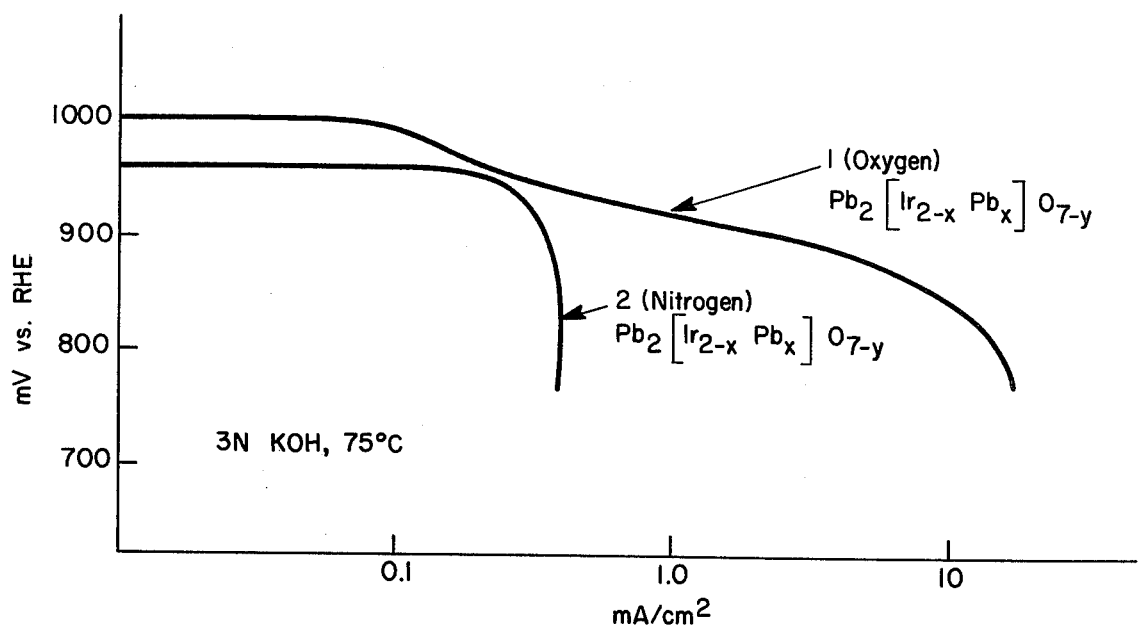
FIG. 13 shows an oxygen reduction curve for lead rich lead iridate in oxygen and in nitrogen.

Pb$_2$[Ir$_{2-x}$Pb$_x$]O$_{7-y}$ of this example is tested as an oxygen electrode. FIG. 13 shows an electrocatalytic performance curve for the reduction of oxygen at 75° C. in 3N KOH using the material of this example as the catalyst (curve 1). When the electrochemical cell is purged with nitrogen and the performance curve is run with nitrogen continually supplied (curve 2), the electrode activity is eliminated. This demonstrates that the activity exhibited by the electrode in oxygen is truly catalytic in nature.

Figure 14:
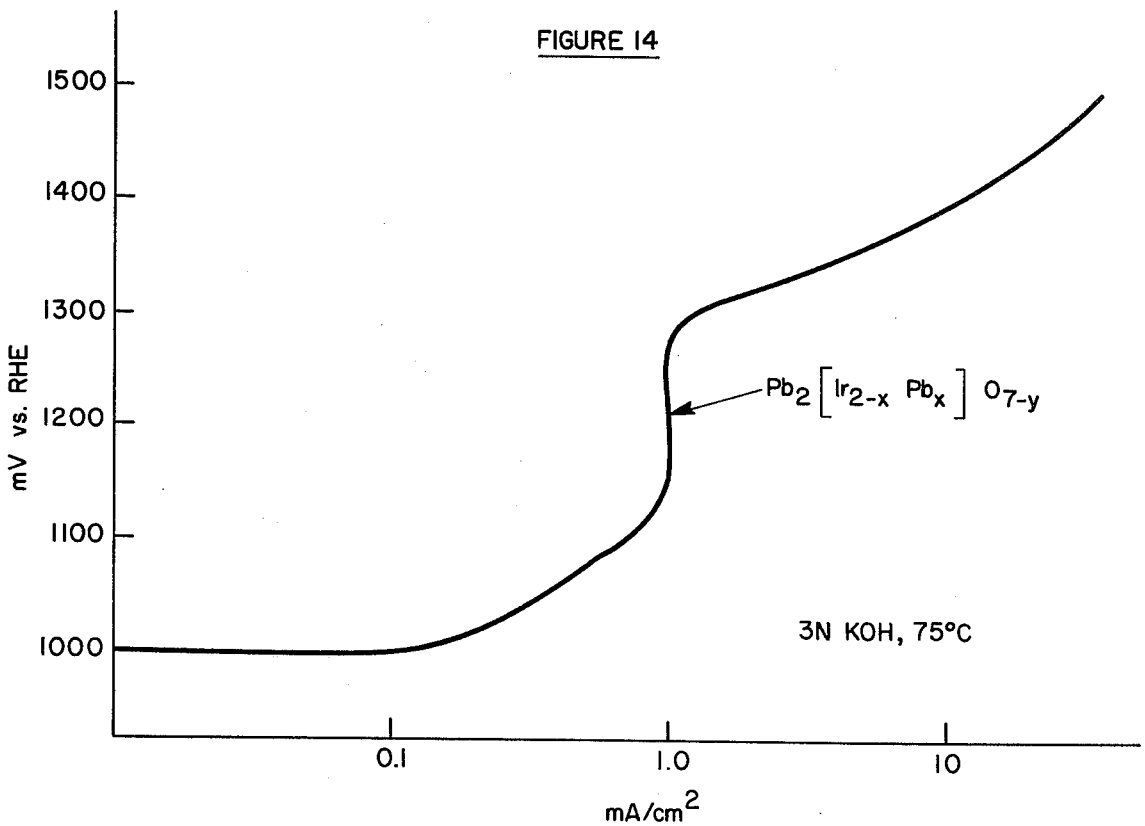
FIG. 14 illustrates an oxygen evolution curve for lead rich lead iridate.

FIG. 14 shows a performance curve for the evolution of oxygen in 3N KOH at 75° C. using Pb$_2$[Ir$_{2-x}$Pb$_x$]O$_{7-y}$ of this example as the catalyst.

EXAMPLE 9

Bi$_2$Rh$_2$O$_{7-y}$, a material that is known in the literature (J. M. Longo et al, NBS Special Publication 364, pp. 219-226, 1972), is prepared as follows:

A mechanically blended mixture of Bi(NO$_3$)$_3$.5H$_2$O and Rh$_2$O$_3$ in a bismuth to rhodium molar ratio of 1:1 is fired for 2 hours at 500° C., 60 hours at 600° C., 20 hours at 700° C., 22 hours at 800° C. and 6 hours at 850° C., all in air, with 5 regrindings. The resulting pyrochlore oxide has a surface area of 0.4 m$^2$/g, and X-ray diffraction confirms that the material consists of single phase Bi$_2$Rh$_2$O$_{7-y}$.

Figure 15:
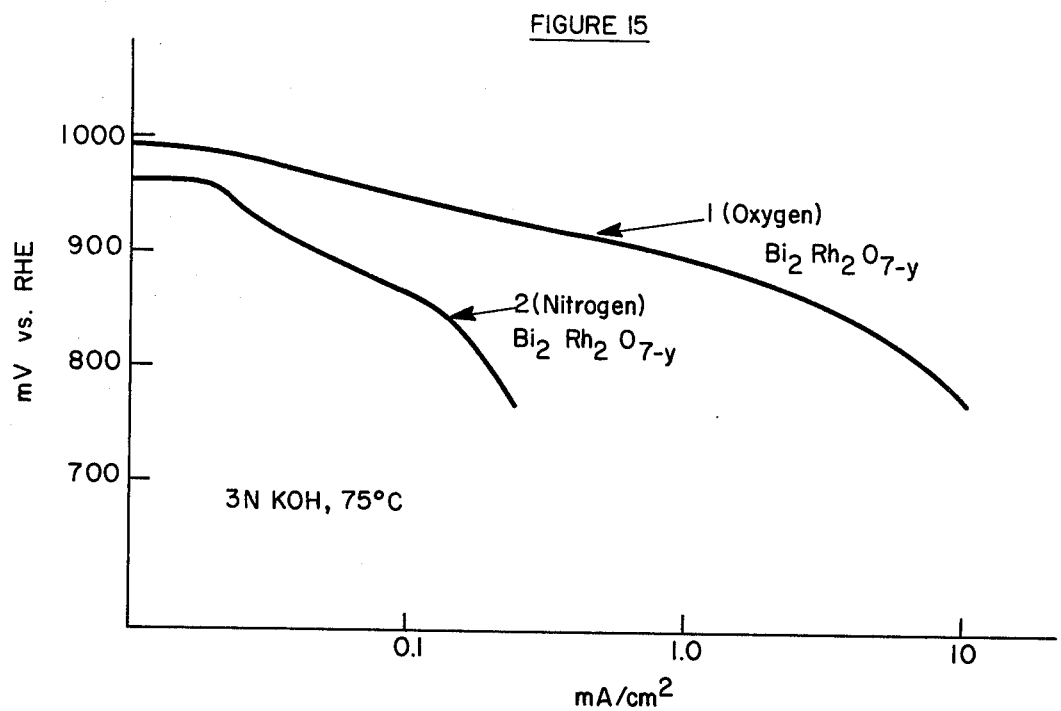
FIG. 15 illustrates an oxygen reduction curve for bismuth rhodate in oxygen and in nitrogen.

Bi$_2$Rh$_2$O$_{7-y}$ of this Example is tested as an oxygen electrode in an electrochemical device in accordance with the procedure of Example 1. FIG. 15 shows an electrocatalytic performance curve for the reduction of oxygen at 75° C. in 3N KOH using the material of Example 9 as the catalyst (curve 1). When the electrochemical cell is purged with nitrogen and the performance curve is run with nitrogen continually supplied (curve 2), the electrode activity is eliminated. This demonstrates that the activity exhibited by the electrode in oxygen is truly catalytic in nature.

Figure 16:
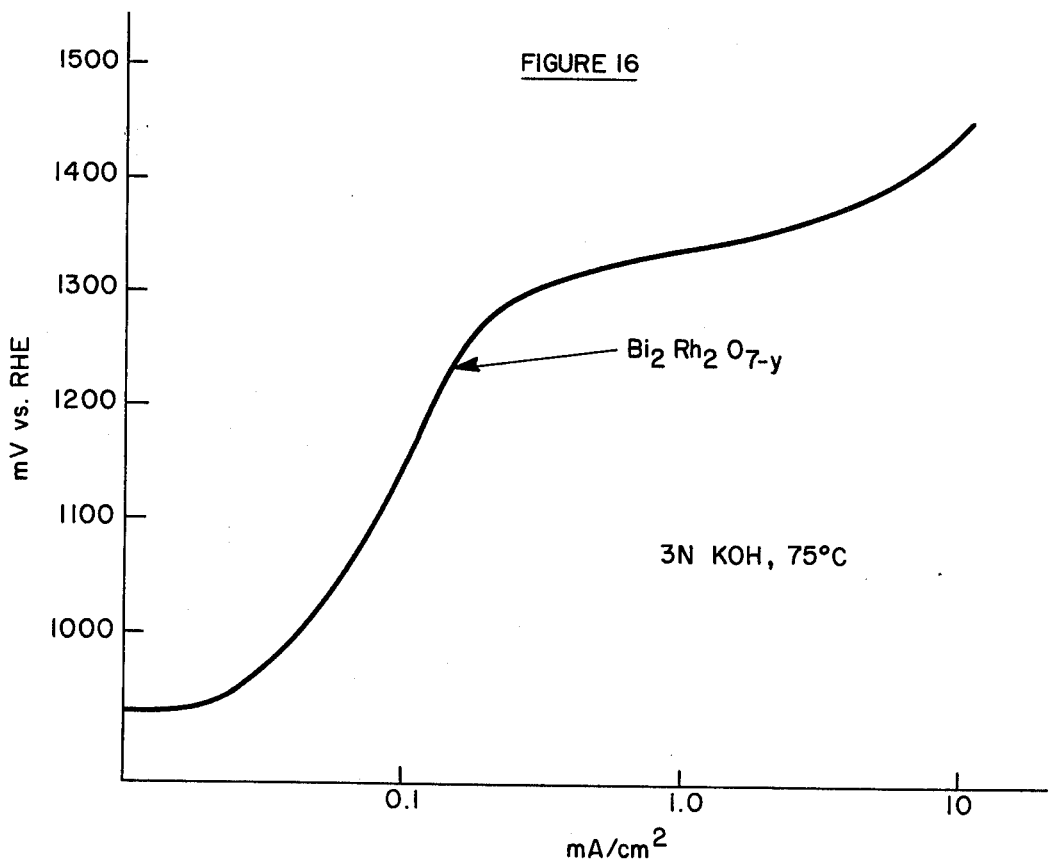
FIG. 16 illustrates an oxygen evolution curve for bismuth rhodate.

FIG. 16 shows a performance curve for the evolution of oxygen in 3N KOH at 75° C. using $Bi_2Rh_2O_{7-y}$ of this Example as the catalyst.

EXAMPLE 10

$Bi_2Ru_2O_7$, a material that is known in the literature (R. J. Bouchard and J. L. Gillson, *Mat. Res. Bull.* Vol. 6, pp. 669–680, 1971), is prepared as follows:

A mechanically blended mixture of $Bi(NO_3)_3 \cdot 5H_2O$ and $RuO_2$ in a bismuth to ruthenium molar ratio of 1:1 is fired for 1 hour at 300° C., 17 hours at 600° C., 17 hours at 700° C., 17 hours at 800° C. and 19 hours at 1000° C., all in air, with 5 regrindings. The resulting oxide has a surface area of 0.2 $m^2/g$. X-ray diffraction reveals that the material is a single phase pyrochlore having a diffraction pattern identical to $Bi_2Ru_2O_7$.

Figure 17:
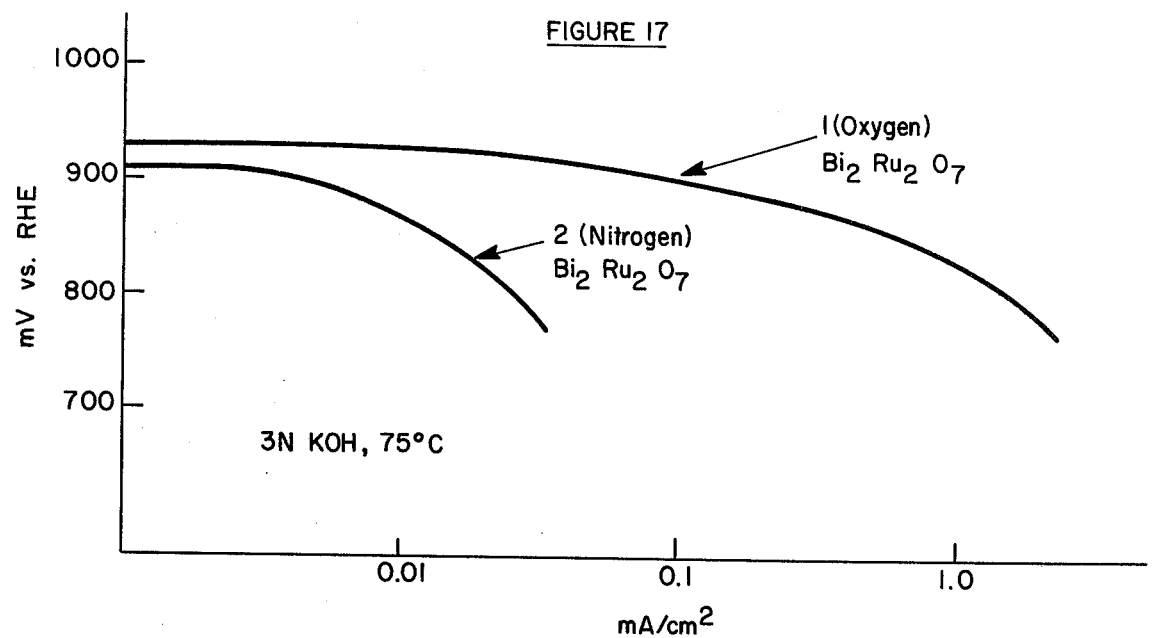
FIG. 17 shows an oxygen reduction curve for bismuth ruthenate in oxygen and in nitrogen.

$Bi_2Ru_2O_7$ of this Example is tested as an oxygen electrode. FIG. 17 shows an electrocatalytic performance curve for the reduction of oxygen at 75° C. in 3N KOH using the material of this example as the catalyst (curve 1). When the electrochemical cell is purged with nitrogen and the performance curve is run with nitrogen continually supplied (curve 2), the electrode activity is eliminated. This demonstrates that the activity exhibited by the electrode in oxygen is truly catalytic in nature.

Figure 18:
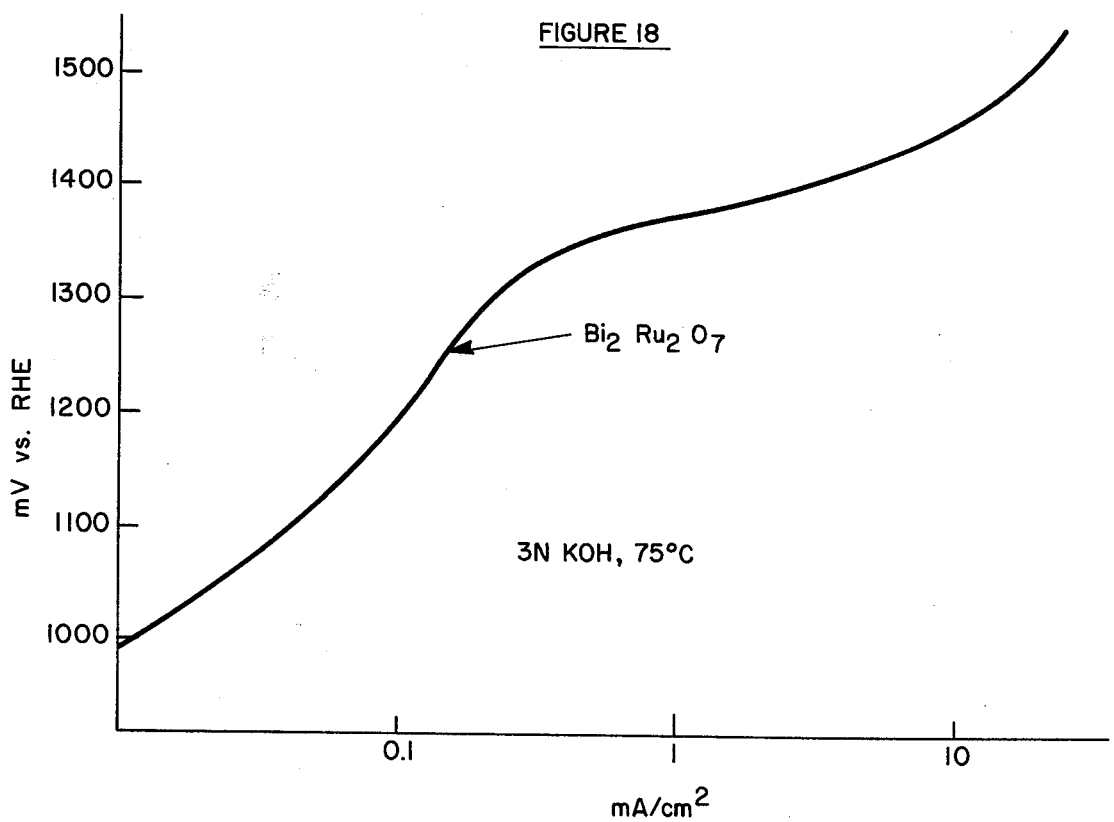
FIG. 18 shows an oxygen evolution curve for bismuth ruthenate.

FIG. 18 shows a performance curve for the evolution of oxygen in 3N KOH at 75° C. using $Bi_2Ru_2O_7$ of this example as the catalyst.

EXAMPLE 11

$PbBi[Ru_2]O_{7-y}$, a material that is known in the literature (R. J. Bouchard and J. L. Gillson, *Mat. Res. Bull.* Vol. 6, pp. 669–680, 1971) is prepared as follows:

A mechanically blended mixture of $Bi(NO_3)_3 \cdot 5H_2O$ + $Pb(NO_3)_2$ + $RuO_2$ in a lead to bismuth to ruthenium molar ratio of 1:1:2 is fired for 2 hours at 500° C., 25 hours at 700° C. and 17 hours at 800° C., all in air, with 6 regrindings. The resulting pyrochlore oxide has a surface area of 0.7 $m^2/g$, and X-ray diffraction confirms that the material consists of single phase $PbBi[Ru_2]O_{7-y}$.

Figure 19:
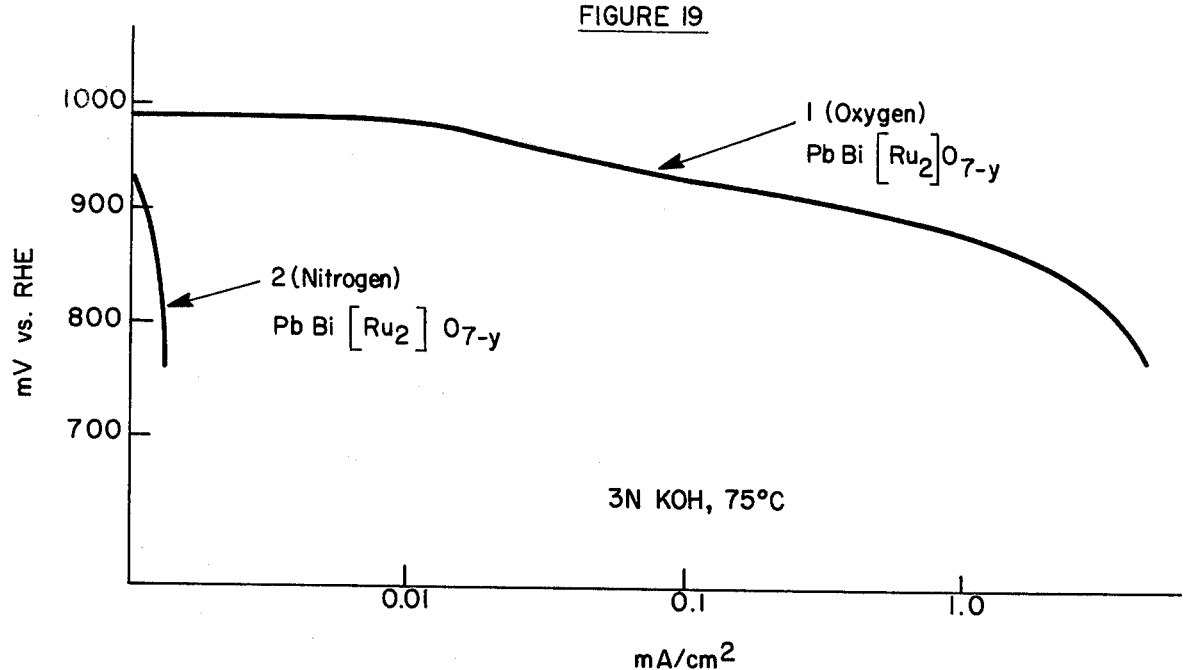
FIG. 19 shows an oxygen reduction curve for $PbBi[Ru_2]O_{7-y}$ in oxygen and in nitrogen.

$PbBi[Ru_2]O_{7-y}$ of this example is tested as an oxygen electrode. FIG. 19 shows an electrocatalytic performance curve for the reduction of oxygen at 75° C. in 3N KOH using the material of this example as the catalyst (curve 1). When the electrochemical cell is purged with nitrogen continually supplied (curve 2), the electrode activity is eliminated. This demonstrates that the activity exhibited by the electrode in oxygen is truly catalytic in nature.

Figure 20:
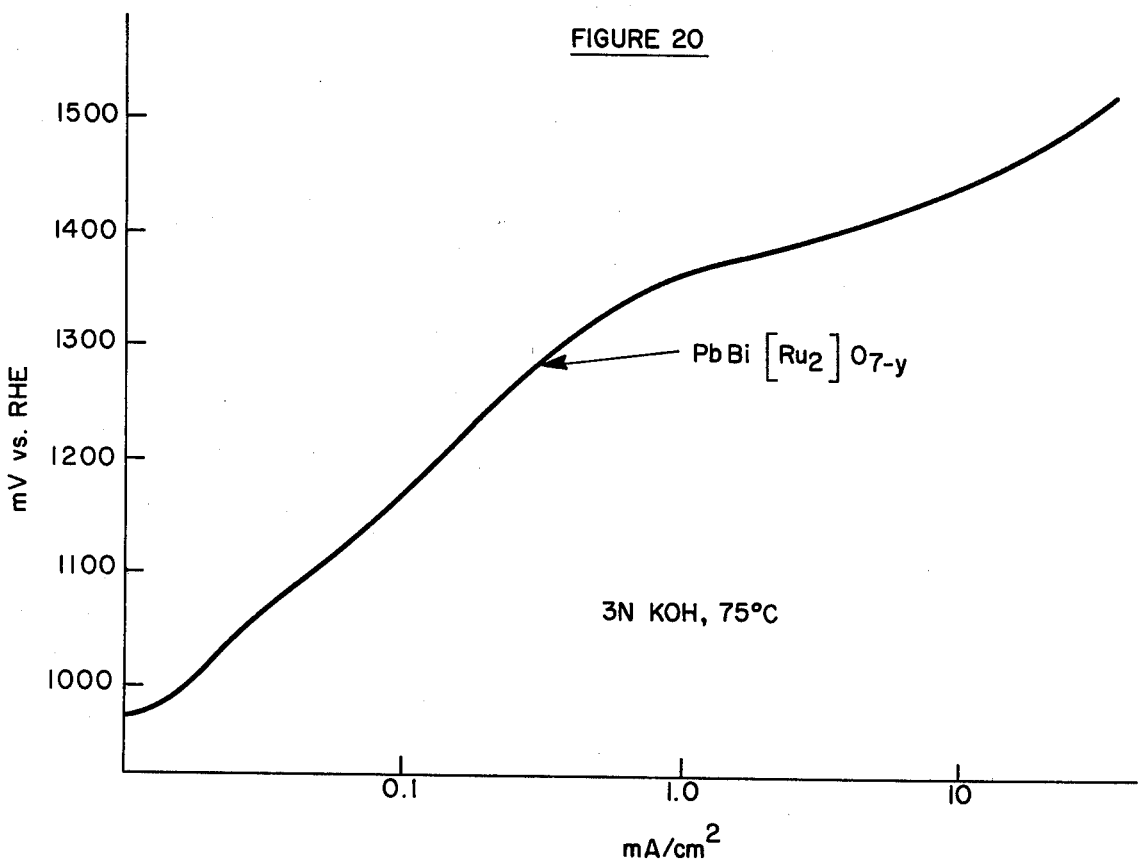
FIG. 20 shows an oxygen evolution curve for lead-bismuth ruthenate.

FIG. 20 shows a performance curve for the evolution of oxygen in 3N KOH at 75° C. using $PbBi[Ru_2]O_{7-y}$ of this example as the catalyst.

What is claimed is:

1. In an electrochemical device having an oxygen electrode containing an electrocatalyst material, the improvement comprising using as said electrocatalyst material one or more compounds selected from the group consisting of those compounds having the following formula:

wherein A is any of the pyrochlore structure metal cations, wherein B is a pyrochlore structure metal cation at least a major portion of which is selected from the group consisting of one or more of Ru, Rh, Ir, Os, Pt, Ru-Pb mixtures and Ir-Pb mixtures and wherein y is greater than or equal to zero and is less than or equal to 1.0.

2. The electrochemical device of claim 1 wherein A is a pyrochlore structure metal cation at least a major portion of which is selected from the group consisting of one or more of Pb, Bi and Tl.

3. The electrochemical device of claim 2 wherein B is a pyrochlore structure metal cation at least a major portion of which is selected from a group consisting of one or more of Ru, Rh, Ir, Ru-Pb mixtures and Ir-Pb mixtures.

4. The elctrochemical device of claim 3 wherein said device is a fuel cell.

5. The electrochemical device of claim 3 wherein said device is a metal-air battery.

6. The electrochemical device of claim 3 wherein said device is an electrolyzer.

7. The electrochemical device of claim 3 wherein said device is a metal electrowinning device.

8. The electrochemical device of claim 2 wherein said device is a fuel cell.

9. The electrochemical device of claim 2 wherein said device is a metal-air battery.

10. The electrochemical device of claim 2 wherein said device is an electrolyzer.

11. The electrochemical device of claim 2 wherein said device is a metal electrowinning device.

12. The electrochemical device of claim 1 wherein said device is a fuel cell.

13. The electrochemical device of claim 1 wherein said device is a metal-air battery.

14. The electrochemical device of claim 1 wherein said device is an electrolyzer.

15. The electrochemical device of claim 1 wherein said device is a metal electrowinning device.

16. The electrochemical device of claim 1 wherein A is selected from the group consisting of Pb, Bi and Tl, and wherein B is selected from the group consisting of Ru, Rh, Ir, Os, Pt, Ru-Pb mixtures and Ir-Pb mixtures.

17. The electrochemical device of claim 16 wherein said device is a fuel cell.

18. The electrochemical device of claim 16 wherein said device is a metal-air battery.

19. The electrochemical device of claim 16 wherein said device is an electrolyzer.

20. The electrochemical device of claim 16 wherein said device is a metal electrowinning device.

21. The electrochemical device of claim 1 wherein said electrocatalyst material is one or more compounds selected from the group consisting of those compounds having the formula:

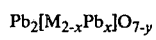

wherein M is selected from the group consisting of Ru, Ir and mixtures thereof, x is greater than zero and less than or equal to about 1.2, and y is greater than or equal to zero and less than or equal to about 1.0.

22. The electrochemical device of claim 21 wherein said device is a fuel cell.

23. The electrochemical device of claim 21 wherein said device is a metal-air battery.

24. The electrochemical device of claim 21 wherein said device is an electrolyzer.

25. The electrochemical device of claim 21 wherein said device is a metal electrowinning device.

26. The electrochemical device of claim 21 wherein x is within the range of about 0.1 to about 1.0.

27. The electrochemical device of claim 21 wherein M is ruthenium.

28. The electrochemical device of claim 21 wherein M is iridium.

29. The electrochemical device of claim 21 wherein x is within the range of about 0.25 to about 0.8.

30. The electrochemical device of claim 21 wherein said device is a fuel cell.

31. The electrochemical device of claim 21 wherein said device is a metal-air battery.

32. The electrochemical device of claim 21 wherein said device is an electrolyzer.

33. The electrochemical device of claim 21 wherein said device is a metal electrowinning device.

* * * * *